(12) United States Patent
Reulet (10) Patent No.: US 10,437,559 B2
(45) Date of Patent: *Oct. 8, 2019

(54) METHOD FOR GENERATING RANDOM NUMBERS AND ASSOCIATED RANDOM NUMBER GENERATOR

(71) Applicant: QUANTUM NUMBERS CORP., Montreal, Quebec (CA)

(72) Inventor: Bertrand Reulet, Sherbrooke (CA)

(73) Assignee: Quantum Numbers Corp., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/024,409

(22) Filed: Jun. 29, 2018

(65) Prior Publication Data

US 2019/0012145 A1 Jan. 10, 2019

Related U.S. Application Data

(63) Continuation of application No. 15/309,857, filed as application No. PCT/CA2015/050408 on May 8, 2015, now Pat. No. 10,042,609.

(60) Provisional application No. 61/990,751, filed on May 9, 2014.

(51) Int. Cl.
*G06F 7/58* (2006.01)
*G06N 10/00* (2019.01)

(52) U.S. Cl.
CPC ............. *G06F 7/588* (2013.01); *G06N 10/00* (2019.01)

(58) Field of Classification Search
CPC ................................. G06F 7/588; G06N 10/00
USPC ............................................. 708/250–256, 3
See application file for complete search history.

(56) References Cited

U.S. PATENT DOCUMENTS

| | | | |
|---|---|---|---|
| 6,070,178 A | 5/2000 | Anderson et al. |
| 6,195,669 B1 | 2/2001 | Onodera et al. |
| 6,324,558 B1 | 11/2001 | Wilber |
| 6,571,263 B1 | 5/2003 | Nagai |
| 6,919,579 B2 | 7/2005 | Amin et al. |
| 6,965,907 B2 | 11/2005 | Klass |
| 7,099,906 B2 | 8/2006 | Messina et al. |
| 7,405,423 B2 | 7/2008 | Tanamoto et al. |
| 7,573,094 B2 | 8/2009 | Ohba et al. |
| 7,930,333 B2 | 4/2011 | Vartsky et al. |
| 7,979,481 B2 | 7/2011 | Sato |

(Continued)

FOREIGN PATENT DOCUMENTS

| CN | 1645626 A | 7/2005 |
|---|---|---|
| CN | 101006422 A | 7/2007 |

(Continued)

OTHER PUBLICATIONS

Barangi Mahmood et al, Straintronics-Based True Random Number Generator for High-Speed and Energy-Limited Applications, IEEE Transactions on Magnetics, IEEE Service Center, New York, NY, US, vol. 52, n°1, Jan. 1, 2016 (Jan. 1, 2016), pp. 1-9.

(Continued)

*Primary Examiner* — Tan V Mai
(74) *Attorney, Agent, or Firm* — Rothwell, Figg, Ernst & Manbeck P.C.

(57) ABSTRACT

A random signal can be obtained from a random tunneling of charges from one conductor to another conductor across a quantum tunneling barrier. The random signal can be amplified and associated to a random number. The association can be performed repetitively to generate a sequence of random numbers.

8 Claims, 6 Drawing Sheets

(56) References Cited

U.S. PATENT DOCUMENTS

| | | |
|---|---|---|
| 8,033,091 B2 | 10/2011 | Michalewicz et al. |
| 8,039,890 B2 | 10/2011 | Matsumoto et al. |
| 8,307,022 B2 | 11/2012 | Matsumoto et al. |
| 8,351,603 B2 | 1/2013 | Oishi et al. |
| 8,495,118 B2 | 7/2013 | Wang et al. |
| 8,521,795 B2 | 8/2013 | Fukushima et al. |
| 8,544,324 B2 | 10/2013 | Michalewicz et al. |
| 8,874,631 B2 | 10/2014 | Matsumoto et al. |
| 9,110,746 B2 | 8/2015 | Zhu et al. |
| 9,164,729 B2 | 10/2015 | Wu et al. |
| 9,529,570 B2 | 12/2016 | Anderson et al. |
| 2001/0020701 A1 | 9/2001 | Zagoskin |
| 2003/0162587 A1 | 8/2003 | Tanamoto et al. |
| 2005/0180219 A1 | 8/2005 | Ohba et al. |
| 2006/0285789 A1 | 12/2006 | Michalewicz et al. |
| 2007/0296025 A1 | 12/2007 | Matsumoto et al. |
| 2008/0076525 A1 | 3/2008 | Kim |
| 2008/0079442 A1 | 4/2008 | Posamentier |
| 2008/0136697 A1 | 6/2008 | Cho et al. |
| 2010/0174766 A1 | 7/2010 | Weeks et al. |
| 2010/0308328 A1 | 12/2010 | Makihara et al. |
| 2011/0043229 A1 | 2/2011 | Michalewicz et al. |
| 2013/0110895 A1 | 5/2013 | Valentino et al. |
| 2014/0287816 A1 | 9/2014 | Homer |
| 2015/0071432 A1 | 3/2015 | Zhu et al. |
| 2016/0062735 A1 | 3/2016 | Wilber |

FOREIGN PATENT DOCUMENTS

| | | |
|---|---|---|
| CN | 103930866 A | 7/2014 |
| CN | 104216678 A | 12/2014 |
| CN | 104516712 A | 4/2015 |
| CN | 106537484 A | 3/2017 |
| DE | 102013004795 A1 | 9/2013 |
| JP | 2003108364 A | 4/2003 |
| JP | 4160605 B2 | 10/2008 |
| JP | 4359130 B2 | 11/2009 |
| JP | 4365872 B2 | 11/2009 |
| JP | 4538066 B2 | 9/2010 |
| KR | 20110132993 A | 12/2011 |
| KR | 101564954 B1 | 11/2015 |
| KR | 20150124405 A | 11/2015 |
| KR | 101617832 B1 | 5/2016 |
| KR | 20160061316 A | 5/2016 |
| WO | 2005101194 A1 | 10/2005 |
| WO | 2005106645 A2 | 11/2005 |
| WO | 2009064197 A2 | 5/2009 |
| WO | 2013068546 A1 | 5/2013 |
| WO | 2016/135611 A1 | 9/2016 |

OTHER PUBLICATIONS

Fong Xuanyao et al, Spin-Transfer Torque Devices for Logic and Memory: Prospects and Perspectives, IEEE Transactions on Computer-Aided Design of Integrated Circuits and Systems, IEEE Service Cenrer, vol. 35, n°1, Jan. 1, 2016 (Jan. 1, 2016), pp. 1-22.

International Search Report issued in PCT/CA2015/050408, dated Jul. 27, 2015, 3 pages.

Stipcevic et al., "True Random Number Generators", 2006, [available online at http://cs.ucsb.edu/~koc/cren/docs/w06/trng.pdf].

Michael A. Wayne, "Optical Quantum Random Number Generation: Applications of Single-Photon Event Timing", 2017, United States. [available online at http://research.physics.illinois.edu/QI/Photonics/theses/wayne-thesis-phd.pdf].

Stipcevic, "Quantum random number generators and their use in cryptography", 2011, United States. [available online at http://research.physics.illinois.edu/QI/Photonics/theses/wayne-thesis-phd.pdf].

Hochul Lee et al. "Design of high-throughput and low-power true random number generator utilizing perpendicularly magnetized voltage-controlled magnetic tunnel junction", AIP Advances 7, 055934, 2017, United States. [available online at http://aip.scitation.org/doi/pdf/10.1063/1.4978320].

Wilber et al., "Entropy Analysis and System Design for Quantum Random Number Generators in CMOS Integrated Circuits", 2013. [available online at https://comscire.com/files/whitepaper/Pure_Quantum_White_Paper.html].

METHOD FOR GENERATING RANDOM NUMBERS AND ASSOCIATED RANDOM NUMBER GENERATOR

CROSS-REFERENCE TO RELATED APPLICATIONS

This application is a continuation of U.S. application Ser. No. 15/309,857, filed on Nov. 9, 2016, now U.S. Pat. No. 10,042,609, which is a national stage entry of International Application No. PCT/CA2015/050408, filed on May 8, 2015, which claims the benefit of Provisional Application No. 61/990,751 filed on May 9, 2014. The entire content of each of these applications is incorporated herein by reference.

FIELD

The improvements generally relate to the field of random number generation.

BACKGROUND

Random numbers have found valuable applications in many fields such as cryptography, games of chance, scientific calculus and/or statistical studies. In these applications, the randomness of the generated random numbers is of great importance since their predictability can lead to unsecure communication, to cheating and/or unreliable scientific results, for instance.

Characteristics which are sought from random number generators include the ability to produce random numbers at a relatively high rate while using devices which are relatively accessible in terms of pricing, bulkiness, etc.

To satisfy these needs, the methods formerly used typically relied on pseudo-random algorithms and/or pseudo-random physical properties of materials. While random numbers generated by such methods may seem completely random at first glance (they may even pass the statistical test suite for random number generators of the National Institute of Standards and Technology (NIST)), such pseudo-random generators are often based on deterministic approaches and can thus have a flaw which can allow predicting the results if the flaw is ultimately discovered.

There thus remained room for improvement in providing a suitable device for producing random number generation.

SUMMARY

Contrary to classical mechanics, quantum mechanics presents features which are inherently random. There is provided herein a method by which the inherently random nature of quantum mechanics can be harnessed for random number generation.

More specifically, there is provided a method for generating random numbers that involve charges (negatively-charged electrons or positively-charged holes) randomly tunneling across a quantum tunneling barrier. The tunneled charges can thus generate a low-level random electrical noise which can be filtered, amplified and sampled for obtaining random numbers from a quantum source. The method can be embodied by relatively simple electronic components and thus be made readily available on a common board.

The charges are repelled by the barrier by the mechanism of classical reflection. However, because of the quantum tunneling effect, some charges proceed across the barrier and thus succeed in passing from one of the conductors to the other. This quantum tunneling effect is intrinsically random and is thus used to produce random numbers. By precisely gauging this quantum tunneling effect via the difference of potential (e.g. biasing), barrier, amplification, filtration, etc, the random number signal stemming from quantum tunneling effect can be satisfactorily harnessed and associated to random numbers. Moreover, the gauging and the choice of electronic components can also allow to produce such random numbers at a satisfactory rate, using surprisingly simple electronic components. The quantum tunneling barrier can be in the form of an electrical insulator sandwiched between conductors, for instance.

Henceforth, the charges that are able to cross the quantum tunneling barrier and generate the random electrical noise (referred to herein as the random signal) can do so in a random manner, with quantum tunneling being known to be a random quantum process exempt from complex yet deterministic elements.

Moreover, there is provided a random number generator which comprises a board or a Printed Circuit Board (PCB) having a quantum tunneling barrier mounted thereon. and adapted to be connected to a voltage source (source of charges) which can be either incorporated directly on the board or provided separately. Since quantum tunneling can involve a large quantity of tunneled charges which can tunnel across the quantum tunneling barrier at a high rate, such a random number generator can, in theory, allow very rapid generation and acquisition of random numbers.

In accordance with one aspect, there is provided a method for generating at least one random number, the method comprising the steps of: quantum tunneling charges from one conductor to another conductor across a quantum tunneling barrier; receiving a random signal stemming from the quantum tunneling of the charges; associating the random signal to a random number; and generating a signal indicative of the random number.

In accordance with another aspect, there is provided a random number generator comprising: a board; a quantum tunneling barrier mounted to the board between two conductors and allowing charges to randomly tunnel from one of the conductors to the other to generate a random signal; an amplifier mounted to the board, the amplifier being connected to one of the two conductors for amplifying the random signal; a sampling device mounted to the board and connected to the amplifier for associating, in real time, the random signal to at least one random number.

In accordance with one aspect, there is provided a method for generating at least one random number, the method comprising the steps of: applying a difference of potential across two conductive layers separated by at least one insulator layer therebetween, the difference of potential causing a random quantum tunneling of charges across the at least one insulator, thereby generating a random signal; and associating the random signal to a random number.

In accordance with another aspect, there is provided a random number generator comprising: a board; a quantum tunneling barrier mounted to the board and having at least two conductive layers and at least one insulator layer therebetween, the at least one insulator layer having two exterior opposite faces each in contact with a corresponding one of the two conductive layers, the two conductive layers being connectable to a first terminal and a second terminal of a voltage source, the quantum tunneling barrier allowing charges to randomly tunnel thereacross to generate a random signal when the voltage source is operated; an amplifier mounted to the board, the amplifier connected to either one two conductive layers for amplifying the random signal; a sampling device mounted to the board and connected to the amplifier for associating in real time the random signal to at least one random number.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
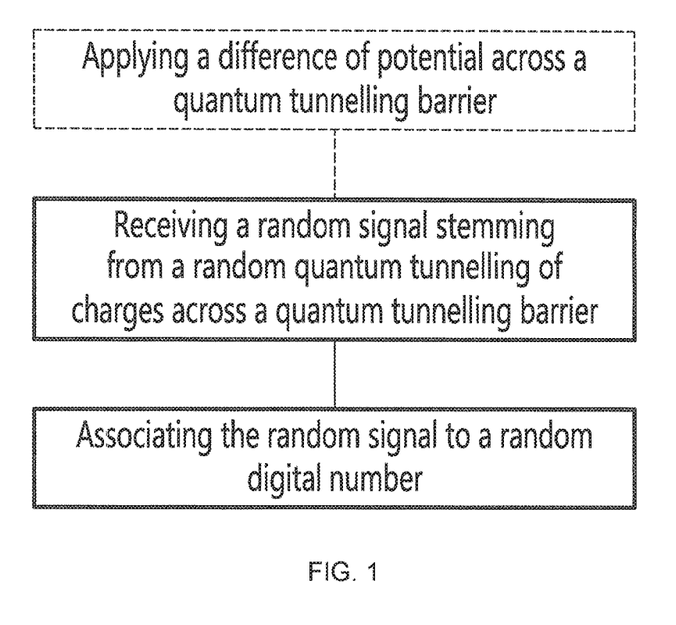
FIG. 1 is a flow chart associated with for generating random numbers.

FIG. 1 is a flow chart associated with a method for generating random numbers based on the principle of random quantum tunneling of charges (electrons or holes) across a quantum tunneling barrier. As will be discussed in more detail below with reference to FIG. 2, the quantum tunneling barrier can be in the form of a spacing between two conductors, across which the charges can either be reflected by classical reflection or pass by quantum tunneling. The random signal stemming from the random tunneling of charges across the quantum tunneling barrier is received (sensed, monitored), and the random signal can be associated to a random number by a computer, or by electronic components based on a real-time amplitude of the signal, to name examples. The process can be repeated a satisfactory number of times, at a satisfactory rate.

The random quantum tunneling can optionally be assisted by a difference of potential applied across the quantum tunneling barrier. The quantum tunneling barrier can be selected in a manner to cause classical reflection of charges, while allowing charges to randomly tunnel thereacross due to quantum processes. The quantum tunneling barrier can be provided in the form of one or more superposed insulating layers as will be detailed below with reference to FIGS. 5A, 5B, 5C, in which case the conductors can include conductive layers applied to the one or more insulating layers, for instance. As the step of applying the difference of potential is performed, the difference of potential can prevent charges from being conducted from one conductive layer to the other due to an inherent potential barrier formed by the at least one insulator layer. Moreover, the insulator layer of the quantum tunneling barrier can harnessed for random tunneling of charges across the quantum tunneling barrier. The method further comprises a step of generating a random signal based on the randomly tunneled charges.

Indeed, as the charges are tunneled from one conductive layer to the other, a current or flow of tunneled charges passes through the insulator layer of the quantum tunneling barrier. These randomly tunneled charges thus generate the random signal which can be processed in a step of associating the random signal received at a given time to random digital number.

Figure 2:
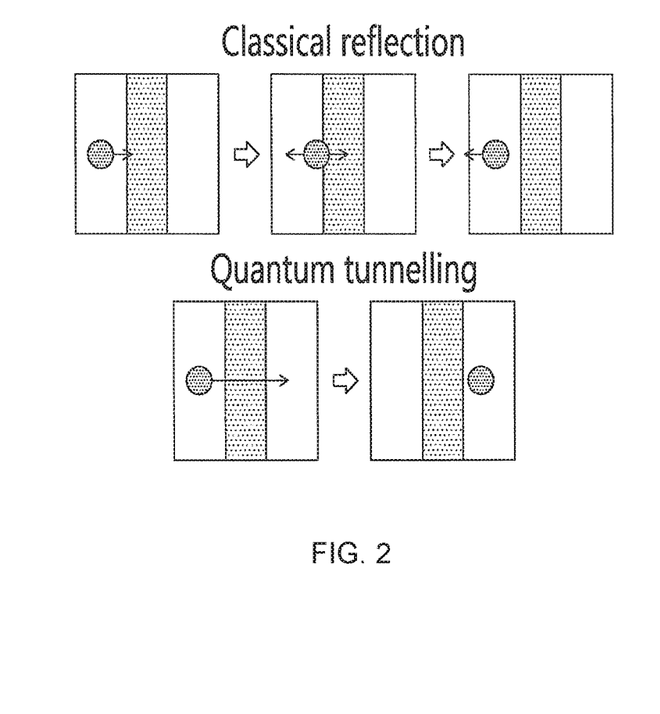
FIG. 2 is a schematic view illustrating an example of a classical reflection of an electron against an insulator layer and an example of a quantum tunneling of an electron through an insulator layer.
Figure 3:
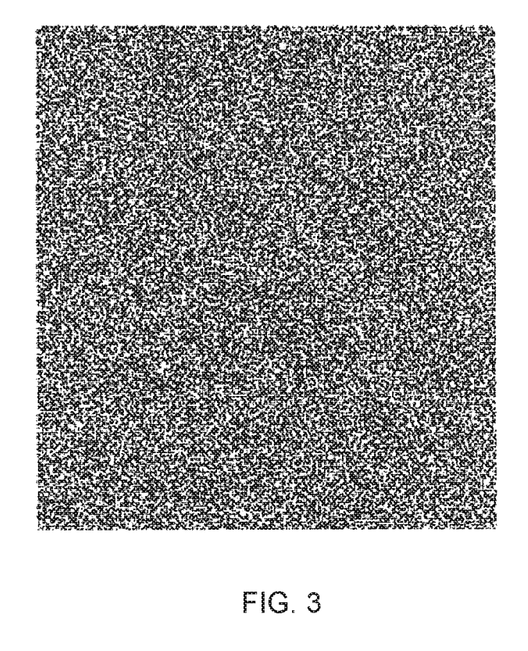
FIG. 3 shows an example of a random number mapping in accordance with an embodiment of the present invention.

As illustrated in FIG. 2, the quantum tunneling barrier has the at least one insulator layer which acts as a reflector for incoming charges. Thus, the charges that passes through the at least one insulator layer have done so by randomly crossing the potential barrier by quantum tunneling.

Moreover, the method may include a step of biasing the difference of potential for fixing the difference of potential applied on the two conductive layers. Moreover, components of the random signal having frequencies below 0.1 MHz and above 6000 MHz can be filtered out of the random signal, thus cleaning the random signal from any noise that can be due to other electric components connected to the conductive layers. Indeed, the random signal can be cleaned from a direct current (DC) portion and from higher frequencies.

Since the random signal generated by the tunneled charges generally is barely measurable, the method for generating random numbers can include a step of amplifying the random signal. The use of the random signal can be limited to components of the random signal which have frequencies between 0.1 MHz and 1000 MHz, as suitable to address potentially undesired components of noise. In other words, the components of the random signal which have a direct current (DC) portion and higher frequencies are not amplified, for instance.

It may be appreciated that the step of associating the random signal to a random digital number may include a step referred to herein as sampling the random signal. Indeed, the sampling step can associate an instantaneous level (in real time) of the random signal to a particular digital number. Once the particular digital number is associated to the instantaneous level of the random signal, one can discriminate the more significant bit and keep only the less significant bits, this has the effect of generating a uniform distribution of the random digital number obtained therefrom. For instance, if the step of sampling digitalizes the random signal to an 8-bit digital number, one can discriminate the four more significant bit and use the four less significant bit.

Moreover, it is noted that since quantum tunneling can involve a large quantity of tunneled charges which can tunnel across the quantum tunneling barrier at a high rate, the step of generating a random signal can allow very rapid variation of the random signal which, in turn, allow a fast acquisition rate of the random digital numbers. For instance, sampling the random signal at a sampling rate above 400 000 kbits/s, preferably above 1 000 Mbits/s and more preferably above 8 Gbits/s is enabled. It is noted, however, that more than one random number generator can be connected in parallel to increase the total number of random numbers generated. For instance, by connecting in parallel two random number generators each having a generation rate of 8 Gbits/s (1 GB/s), a total generation rate of 16 Gbits/s (2 GB/s) can be achieved, and so on.

Figure 4:
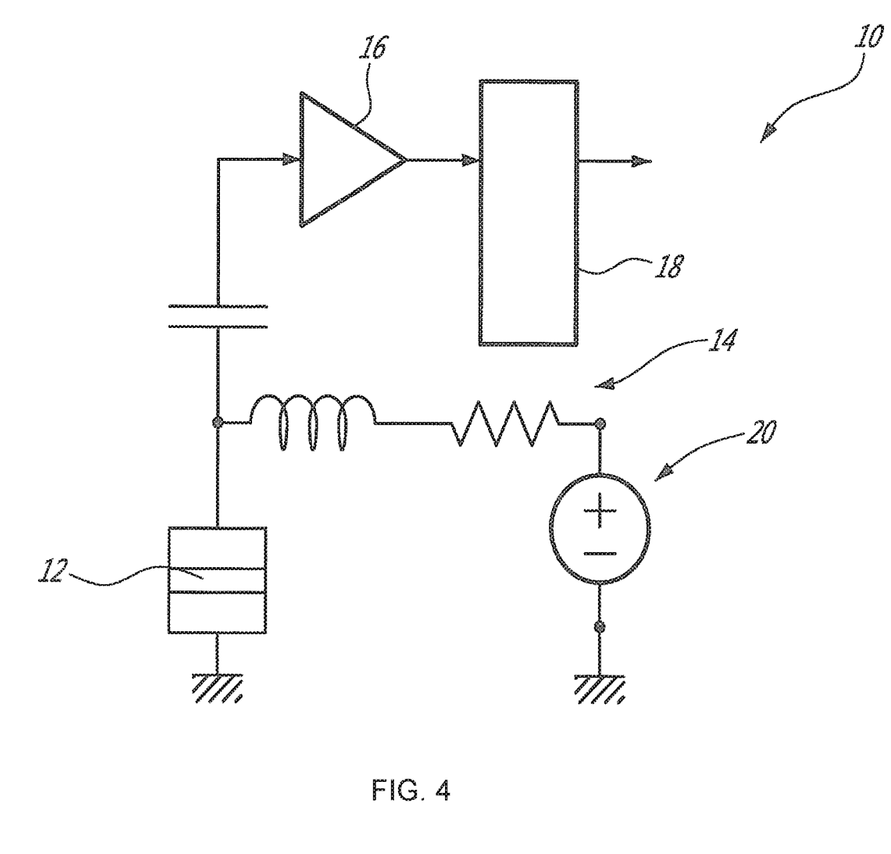
FIG. 4 is an electrical circuit associated with an example of a random number generator.

FIG. 4 shows an electrical circuit 10 associated with an example of a random number generator. The random number generator generally comprises a board (not shown) on which the electrical circuit 10 is mounted. The electrical circuit 10 of the random number generator can include the quantum tunneling barrier 12, a biasing device 20, an amplifier 16, a sampling device 18 and a filter 14 which are mountable on the board. For instance, the board may be a printed circuit board (PCB) that mechanically supports the components and electrically connects the components to one another via conductive tracks etched from copper sheets laminated onto a non-conductive substrate.

As mentioned above, the quantum tunneling barrier can be provided in the form of a quantum tunneling component having a quantum tunneling barrier in the form of one or more insulator layers sandwiched between conductive layers acting as conductors. It is noted that the conductive layers can be made of a metallic material or of a semiconductor material, for instance, while the insulator layer can be made of any material which satisfactorily inhibits the free conduction of electrons (or holes) thereacross via classical reflection. Indeed, any material which can provide an energy barrier which is crossable by quantum tunneling can be used in the quantum tunneling barrier. For instance, the insulator layer can be made of a non-doped semiconductor. Accordingly, the two conductive layers can be made of semiconductor material while the insulator layer can be made of an insulator semiconductor. In this example, the insulator semiconductor can have a band gap which forces the charges (electrons or holes) to pass thereacross by quantum tunneling, and wherein the two conductive layers can be n-doped or p-doped. The insulator layer has two exterior opposite faces each in contact with a corresponding one of the two conductive layers and the two conductive layers can be connectable to a first terminal and a second terminal of a voltage source. It may be appreciated that the voltage source may be either mounted on the board and fixedly connected to the conductive layers of the quantum tunneling barrier or be provided separately thereto.

In this embodiment, the biasing device 20 can be used to perform a step of biasing, the amplifier 16 can be adapted to perform a step of amplifying the random signal, the sampling device 18 can be adapted to perform a step of sampling the random signal and the filter 14 can be adapted to perform the step of filtering the random signal. The filter can be connected to the quantum tunneling barrier, which is, in turn, connected to the amplifier and then to the sampling device. When operatively connected one to the others, the electrical circuit can instantaneously sample the random signal in order to obtain a random number. Moreover, the biasing device can fix the difference of potential applied to the quantum tunneling barrier. Accordingly, the bias of the biasing device can be adjusted to encompass any noise that could be incorporated, in the electrical circuit, by the amplifier or the sampling device, for instance.

Figure 5A:
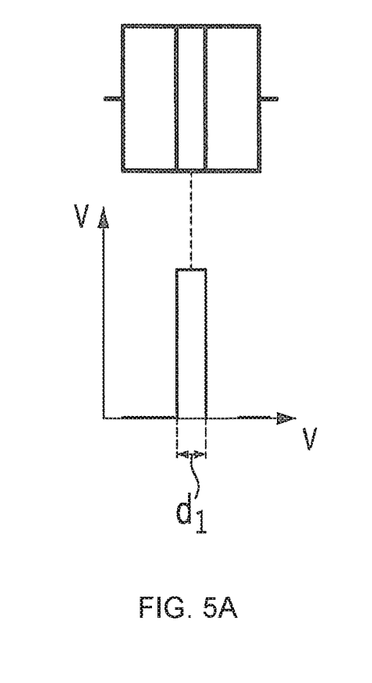
FIGS. 5A to 5C show schematic views of a quantum tunneling barrier having at least one insulator layer.
Figure 5B:
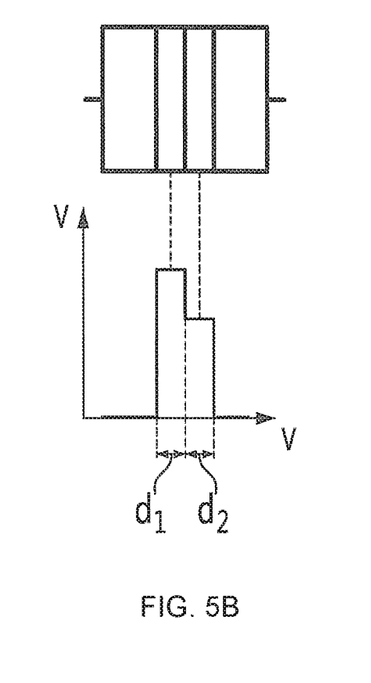
Figure 5C:
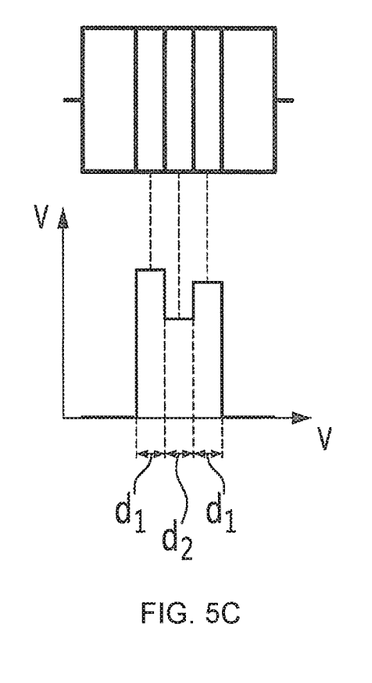

FIGS. 5A to 5C show three examples of the quantum tunneling barrier. In these examples, it can be seen that one or more than one insulator layers can be used. More specifically, FIG. 5A shows an insulator layer having a first thickness $d_1$, while FIG. 5B shows a quantum tunneling barrier having two insulator layers, respectively having a first thickness $d_1$ and a second thickness $d_2$. Moreover, and in an exemplary manner, FIG. 5C shows a quantum tunneling barrier having three insulator layers, respectively having a first thickness $d_1$, a second thickness $d_2$ and a third thickness $d_3$. Although only three examples have been provided, the quantum tunneling barrier may have more than three insulator layers as well. The material of the insulating layers can vary and different materials can be used from one successive layer to another. Typically, the successive layers can have an additive effect in terms of the level of the barrier effect, allowing to reach a desired level with a plurality of layers if desired.

Figure 6:
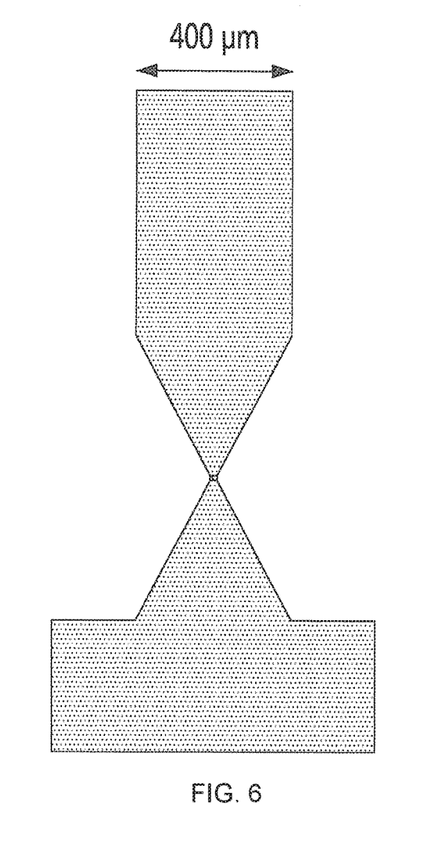
FIG. 6 shows a schematic view an example of a quantum tunneling barrier.
Figure 7A:
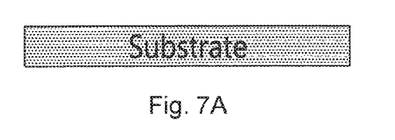
FIGS. 7A-7H show schematic views of the steps of an example of a photolithography process for fabricating a quantum tunneling barrier.
Figure 7B:
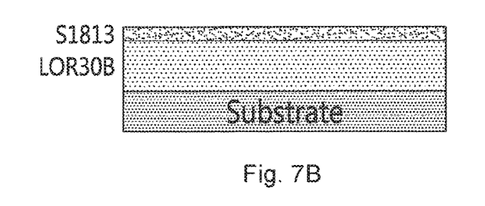
Figure 7C:
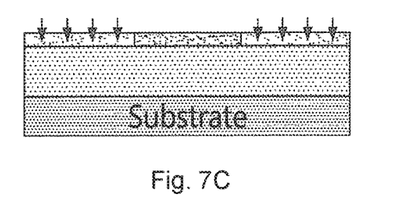
Figure 7D:
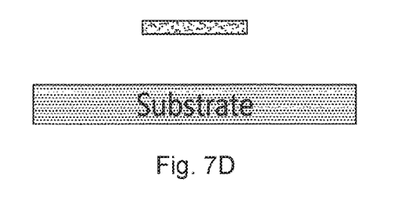
Figure 7E:
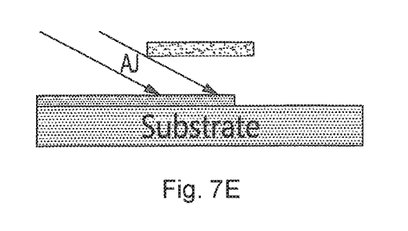
Figure 7F:
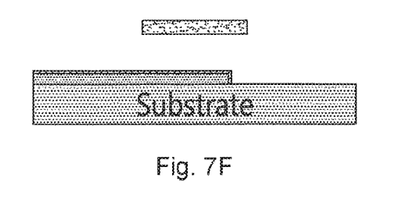
Figure 7G:
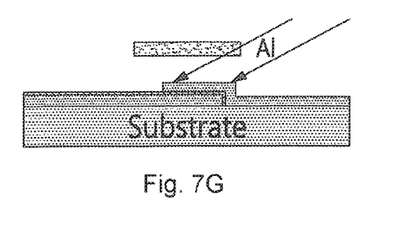
Figure 7H:
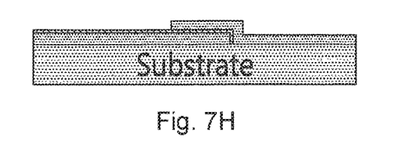

FIG. 6 shows a schematic top view of a quantum tunneling barrier in accordance with the present invention. In this example, the conductive layers of the quantum tunneling barrier are etched from a metallic material such as aluminium and are laminated onto a non-conductive substrate such as silicon dioxide. The quantum tunneling barrier is illustrated with a red line and has an overlapping region of approximately 10 μm$^2$ having dimensions of 1 μm per 10 μm, for instance. Still in this example, the layer of insulator is comprised between the two conductive layers where it is noted that the charges can travel from the top conductive layer through the bottom conductive layer by quantum tunneling. The insulator layer can be made of aluminium oxide ($Al_2O_3$). It can be seen that the thickness of the insulator layer is 1 nm, for instance and can have a resistance of approximately 50 ohms. It is known that the resistance of the quantum tunneling barrier can depends on the overlapping area.

Although, the fabrication method of the quantum tunneling barrier can vary, an example fabrication method based on a photolithography technique known as a Dolan Bridge will now be provided for illustrative purposes with reference to FIGS. 7A-7H. In this example, a photolithography system such as a SF-100 Xpress was used concurrently with resins referred to as LOR30B and S1813. Indeed, the method of fabrication may include a step of cleaning a substrate from impurities (a), a step of applying a layer of LOR30B resin on the cleaned substrate, applying a layer of S1813 resin onto the layer of LOS30B resin (b). Then, a further step of exposing, to UV light, the S1813 resin everywhere except for a segment (which can form a Dolan bridge) can be performed (c). Then, a step of chemically removing the layer of S1813 resin which was exposed with UV light can be performed as well as a step of chemically removing the layer of LOR30B for leaving the segment of layer S1813 (referred to as the Dolan bridge) intact (d). Subsequently, a first conductive layer can be evaporated onto the substrate using the Dolan bridge as a mask in order for the first conductive layer to lay on the substrate and to protrude from one side of the Dolan bridge, and therebelow, as far as the latter allows it (e). Then, an insulator layer of aluminium oxide can be evaporated onto the first conductive layer (f). A second conductive layer can be evaporated onto the insulator layer, using the other side of the Dolan bridge, and therebelow, as far as the latter allows it, forming an overlapping region where the insulator layer is sandwiched between the two conductor layers. Finally, the Dolan bridge can be removed to uncover a completed quantum tunneling component.

Moreover, one skilled in the art may appreciate that by providing a quantum tunneling device mounted directly to a board can lead to a device having a low cost and whose manufacturing process can be implemented in specialized facilities such as fabs, for instance.

Although one person skilled in the art may be aware of which hardware components can be used in the random number generator. In one embodiment, for instance, the quantum tunneling barrier may exhibit a resistance of 54 ohms. The biasing device can be a bias-tee Mini-Circuits ZFBT-6GW+. The sampling device can be an 8-bits data acquisition board having a sampling frequency of 3 billion samplings per second and manufactured by Ultraview™. As mentioned above, the sampling frequency can be limited for limiting a correlation between consecutive levels of random signal. For instance, the sampling frequency can be limited to 1 billion samplings per second. Moreover, amplifying the random signal by 52 dB was found to be sufficient for the random number generator. The amplifiers can incorporate two amplifiers Mini-Circuits ZFL-1000LN+ along with attenuators Mini-Circuits BW-S3W2+ for tuning the level of amplification of the random signal. With such an embodiment, the random number generator can generate up to 4 billions bits numbers per second (4 Gbits/s), which is way faster than the closest competitor, the random number generator GRANG from LETech, achieving 0.4 Gbits/s.

It is further noted that when the bias is 0 V (i.e. in the absence of a biasing device), the noise is thermal and the charges can pass through the quantum tunneling barrier via quantum tunneling. Such thermal noise can directly be used as the source of the random signal though in the embodiment presented above, it was preferred to use the quantum tunneling effected generated by application of a difference of potential across the barrier. In the event where the energy $eV$ is greater than $kT$, wherein e is the electrical charge, V is the bias, k is the Boltzmann constant and T is the absolute temperature in Kelvin degrees, e.g. V>25 mV, the noise can become a shot noise which is proportional to V, i.e. greater is V, greater the generated random signal is. In this situation, the contribution from the other electrical components of the electrical circuit can be negligible. However, it can be preferred to bias V. For instance, the quantum tunneling barrier can collapse if it surpasses a collapsing threshold, which can motivate biasing. In the example described and illustrated, suitable use of the quantum tunneling barrier was achieved at V=0.25 V.

Furthermore, it is noted that the sampling device can be provided in the form of a digital comparator having one input number being the random signal and another input number being zero. When the random signal is positive, then the digital comparator is adapted to provide a binary 1, if not, it provides a binary 0. In such a configuration, known algorithms can be used to prevent a bias of the zero value of the other input number. Accordingly, the digital comparator can be used to obtain a series of successive and random binary 1's and 0's which can be used to provide random numbers. As may be appreciated by a person skilled in the art, the amplifier and the sampling device could be limited to frequencies in the order of the kHz for limiting the cost of the random number generator. Moreover, the biasing device may be integrated directly in the amplifier. Such a biasing device could bias the difference of potential and also amplify the biased difference of potential in the same electrical component. It is further noted that biasing the difference of potential can be used as long as it does not interfere with the amplifier. Although the use of a sampling device or a digital comparator to convert the random noise to random numbers is presented herein, other techniques could also be implemented by a person skilled in the art.

It is further noted that the random number generator can be mounted on a Universal Serial Bus (USB) device which can provide a portable device achieving speeds up to 480 Mb/s with USB 2.0 and even higher with USB 3.0. Alternatively, the random number generator can be mounted to a Peripheral Component Interconnect (PCI) device and achieve up to 1 Gb/s to 17 Gb/s. Furthermore, the random number generator can be implemented directly from an Original Equipment Manufacturer (OEM) motherboard.

Increasing the difference of potential can increase the signal. Alternately, heating the junction can increase the quantum noise, and thus the signal as well.

As can be understood, the examples described above and illustrated are intended to be exemplary only. The scope is indicated by the appended claims.

What is claimed is:

1. A method for generating at least one random number, the method comprising the steps of:
    generating a current of charges tunneling from a first one of two conductors to a second one of the two conductors across an insulator material, the current of the tunneled charges having an instantaneous level varying randomly due to quantum tunneling and forming a random signal, wherein each one of the two conductors is configured to be connectable to a corresponding terminal of a voltage source;
    associating the instantaneous level of the random signal to a random number; and
    generating a signal indicative of the random number.

2. The method of claim 1 further comprising generating the quantum tunnelling of charges by applying a difference of potential across the two conductors, and wherein during said applying a difference of potential, said quantum tunnelling barrier causes classical reflection of charges driven against it by the difference of potential.

3. The method of claim 1, further comprising amplifying the instantaneous level of the random signal prior to said association.

4. The method of claim 3, wherein said amplifying is applied solely to components of the instantaneous level of the random signal within a frequency bandwidth of 0.1 MHz to 1000 MHz.

5. The method of claim 1, wherein said associating further comprises sampling the instantaneous level of the random signal.

6. The method of claim 5, wherein said sampling further comprises determining the random number based on one or more of the least significant bits of a plurality of bits of the sampled random signal.

7. The method of claim 5, wherein said sampling is performed at a rate above 1 billion samplings per second.

8. The method of claim 1, wherein the two conductors are in the form of conductive layers sandwiching the insulator material.

* * * * *